(12) United States Patent
Gray et al.

(10) Patent No.: US 11,537,671 B1
(45) Date of Patent: Dec. 27, 2022

(54) UNIFIED SEARCH

(75) Inventors: Timothy T. Gray, Seattle, WA (US); Aaron Michael Donsbach, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 632 days.

(21) Appl. No.: 13/540,287

(22) Filed: Jul. 2, 2012

(51) Int. Cl.
*G06F 16/9535* (2019.01)
*G06F 16/958* (2019.01)

(52) U.S. Cl.
CPC ............................... *G06F 16/9535* (2019.01)

(58) Field of Classification Search
None
See application file for complete search history.

(56) References Cited

U.S. PATENT DOCUMENTS

| | | | | |
|---|---|---|---|---|
| 5,841,437 | A * | 11/1998 | Fishkin et al. | 345/619 |
| 2003/0069893 | A1 * | 4/2003 | Kanai | G06F 16/58 |
| 2005/0149500 | A1 * | 7/2005 | Marmaros et al. | 707/3 |
| 2005/0165777 | A1 * | 7/2005 | Hurst-Hiller et al. | 707/4 |
| 2005/0289109 | A1 * | 12/2005 | Arrouye | G06F 16/14 |
| 2006/0031043 | A1 * | 2/2006 | Oral | G06F 16/338 |
| | | | | 702/187 |
| 2006/0218499 | A1 * | 9/2006 | Matthews | G06F 16/313 |
| | | | | 715/765 |
| 2006/0294063 | A1 * | 12/2006 | Ali | G06F 17/30997 |
| 2007/0038665 | A1 * | 2/2007 | Kwak | G06F 16/972 |
| 2008/0281974 | A1 * | 11/2008 | Slothouber | G06F 17/30867 |
| | | | | 709/229 |
| 2008/0319849 | A1 * | 12/2008 | Rapoport | G06Q 30/02 |
| | | | | 705/14.13 |
| 2009/0192982 | A1 * | 7/2009 | Samuelson | G06F 16/248 |
| 2009/0228825 | A1 * | 9/2009 | Van Os et al. | 715/780 |
| 2011/0191332 | A1 * | 8/2011 | Barve | G06F 16/00 |
| | | | | 707/723 |
| 2012/0016861 | A1 * | 1/2012 | Edwards | G06F 16/48 |
| | | | | 707/707 |
| 2012/0124062 | A1 * | 5/2012 | Macbeth | H04L 67/16 |
| | | | | 707/749 |
| 2012/0284247 | A1 * | 11/2012 | Jiang | G06F 16/9535 |
| | | | | 707/706 |

\* cited by examiner

*Primary Examiner* — Yu Zhao
(74) *Attorney, Agent, or Firm* — Eversheds Sutherland (US) LLP

(57) ABSTRACT

User devices are used to access data ranging from calendar items to Internet searches. A unified search interface provided by a unified search module enables a user of the user device to search data associated with one or more applications across applications on the user device as well as data in remote locations, such as on a server via a network connection. The unified search module may be provided as part of the operating system module, and accessible without special configuration of the applications.

19 Claims, 13 Drawing Sheets

UNIFIED SEARCH

BACKGROUND

A variety of user devices, such as electronic book ("e-Book") reader devices, desktop computers, portable computers, game consoles, smartphones, tablet computers, and so forth are used to access data ranging from calendar items to internet searches. Searching for information stored on, or accessible by, the user devices has traditionally been cumbersome to use.

Figure 1:
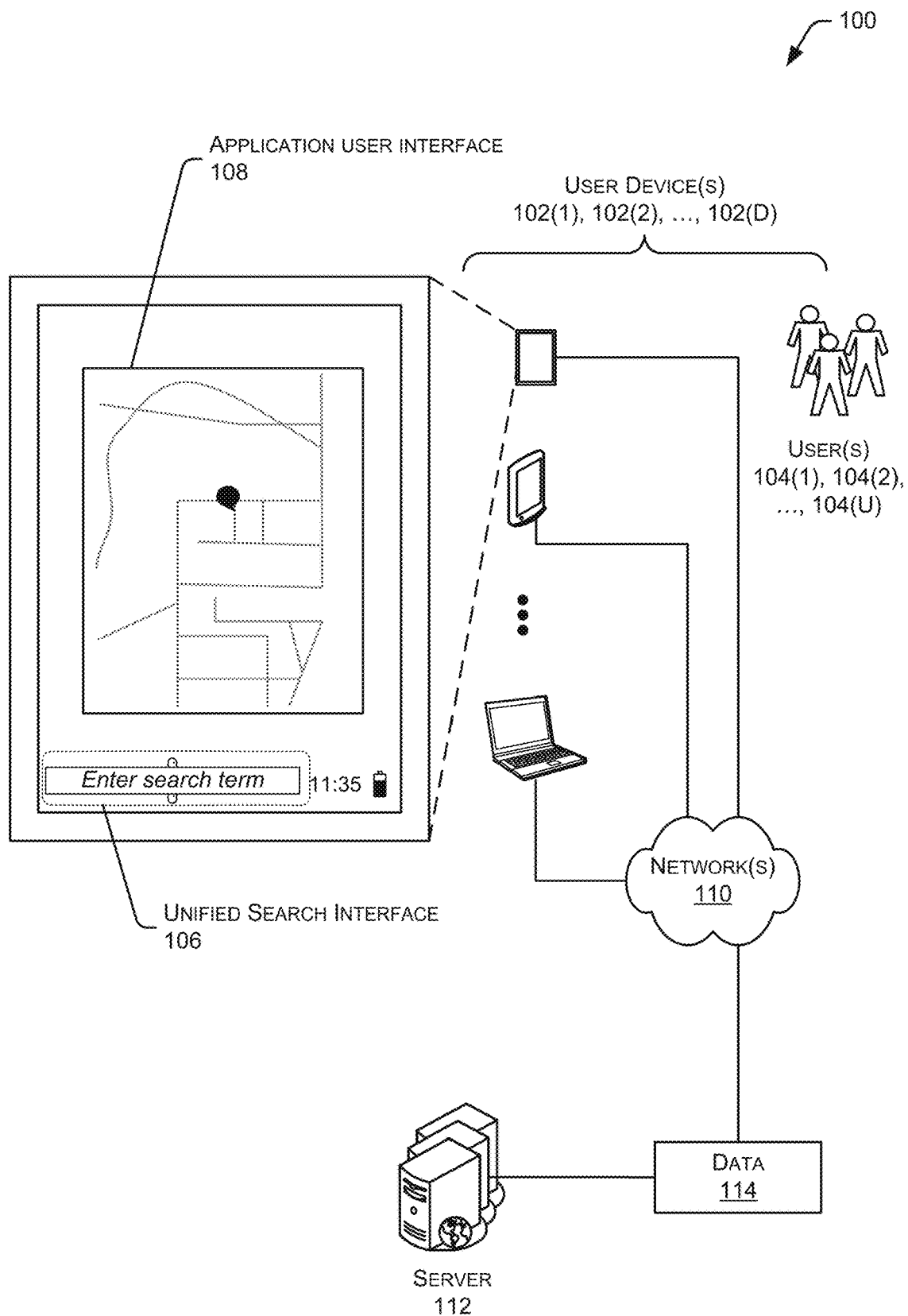
FIG. 1 illustrates a system for providing a unified search interface which persists during presentation of user interfaces associated with one or more applications.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

A variety of user devices, such as electronic book ("e-Book") reader devices, desktop computers, portable computers, game consoles, televisions, smartphones, tablet computers, and so forth are used to access various forms of information including but not limited to content such as movies, books, and music. As the amount of information accessible by the user devices increases, finding information of interest becomes more difficult for users. Traditional searches on the user devices are complicated in situations where the user device executes an application to perform a non-search related task, such as entering a calendar item, drawing a picture, accessing medical data, viewing Internet content, and so forth. These traditional searches involve the user invoking a particular search application, returning to a main menu or home screen, or engaging in activity in which attention of the user shifts away from a particular application executing on the user device to the particular search application. For example, when typing a note in a note application on a smartphone user device, initiating a search may call for the user to enter several commands. These commands may then open a user interface for that search, which obscures or replaces the user interface of the note application, disrupting the user's view of the note being entered. As a result, searching for information on the user device has traditionally been disruptive to the user and the operation of the non-search application.

Described herein are systems and methods for providing a unified search interface which is persistently presented in the user interface. A unified search allows for searching across one or more applications, data associated with those applications, remote resources such as on external servers, and so forth. The data associated with applications includes application data, metadata, content data, and so forth. The unified search interface provides the user with controls to initiate the unified search and vary the scope of that search. For example, where the user interface is graphical, the unified search interface may appear at the bottom of a display as a search box. The user may perform a search using the unified search interface, and receive search results which may be sorted. The sort may be by calculated relevance, current application focus, history of application focus, and so forth. For example, search results associated with the application presented on the display at the time of the search may be prioritized and presented first.

The unified search interface may be configured with a search scope control. The search scope control allows the user to vary a search scope which controls what information is searched or filtered for presentation. The search scope may determine one or more of what, where, or how information is searched. For example, the user may select to search just within a particular note document, across all note documents, or across all data on the user device and on the Internet via an Internet search engine. The search scope control may allow for dynamic adjustment of the search scope. In some implementations, the search scope control may comprise a slider control element configured to vary the search scope. For example, the user may enter a search term, see search results, and move the slider control element on a touch screen display representing the search scope control to change the search scope, to narrow or broaden the search results as desired.

Illustrative System

FIG. 1 illustrates a system 100 for providing a unified search interface which persists during presentation of user interfaces associated with one or more applications. One or more user devices 102(1), 102(2), . . . 102(D) may be used by one or more users 104(1), 104(2), . . . 104(U). As used herein, letters enclosed by parenthesis such as "(D)" or "(U)" indicate an integer having a value greater than zero. The user devices 102 may include e-Book reader devices, laptops, tablet computers, game consoles, media players, and so forth. The user devices 102 are described in more detail below with regard to FIG. 2.

A unified search interface 106 is presented by the user device 102 to the user 104. The unified search interface 106 is configured to receive user input. The user input may be one or more of: gestures, machine recognized speech, text entered via a touch sensor or buttons, and so forth. The unified search interface 106 may then present at least a portion of the search results generated by a unified search module. The unified search module is discussed below in more detail with regard to FIG. 2.

The unified search interface 106 is configured to persist on the user device 102. For example, where the unified search interface 106 is visually presented on the display as shown here, the unified search interface 106 remains presented even during transitions of applications between a foreground state and a background state. For example, a clock provided on a desktop user interface persists regardless of the applications executing, what windows may be open, and so forth. In another example, on a smartphone a wireless signal strength indicator persists and is visible regardless of the applications executing.

In some implementations the unified search interface 106 may persist but be concealed from view. For example, during presentation of a movie on the display of the user device 102, the persistent elements such as the unified search interface 106, the wireless signal strength indicator, and so forth may be temporarily concealed from view, reduced in size, replaced with a representative element such as an icon, and so forth. This concealment leaves the display unobstructed for presentation of the movie. The user 104 may readily access the unified search interface 106 by touching a button or a portion of the touch screen. As a result, the unified search interface 106 is persistently available, but in some implementations may be concealed or minimized.

In addition to the unified search interface 106 which remains presented during normal operation of the user device 102, an application user interface 108 may be presented. The application user interface 108 provides a user interface for other functions, such as a note application, a map application, an internet browser application, an operating system configuration, and so forth.

While user interfaces in these illustrations are depicted as visual user interfaces, such as graphical user interface ("GUI") or a character user interface ("CUI"), the unified search interface 106 may be provided in non-visual interfaces. For example, where haptic or tactile output is used in a user device 102 for use by the visually impaired, the unified search interface 106 may be presented haptically instead of, or in addition to, a visual presentation. In another example, a CUI may omit graphical elements and use text to provide for menus, data presentation, and so forth.

In this and the following illustrations, the unified search interface 106 is depicted at the bottom of the display of the user device 102. However, in other implementations, the unified search interface 106 may be presented in other areas of the display, or may be switched to presentation in other modes, such as a haptic presentation mode when a haptic output device is available.

The user device 102 may be configured to connect to a network 110. This coupling may be wired or wireless. The network 110 may include, but is not limited to, the Internet, a private network, a virtual private network, a wireless wide area network, a cellular data network, a local area network, a metropolitan area network, a telephone network, and so forth. The network 110 may also be coupled to a server 112 and other devices. The user devices 102 may exchange data 114 with other user devices 102 or with the server 112 via the network 110. This data 114 may comprise user input received by the unified search interface 106, search results, and so forth.

The server 112 may use the data 114 to generate search results. These search results may then be provided to the user device 102, such as via the network 110. The server 112 is described below in more detail with regard to FIG. 3.

Figure 2:
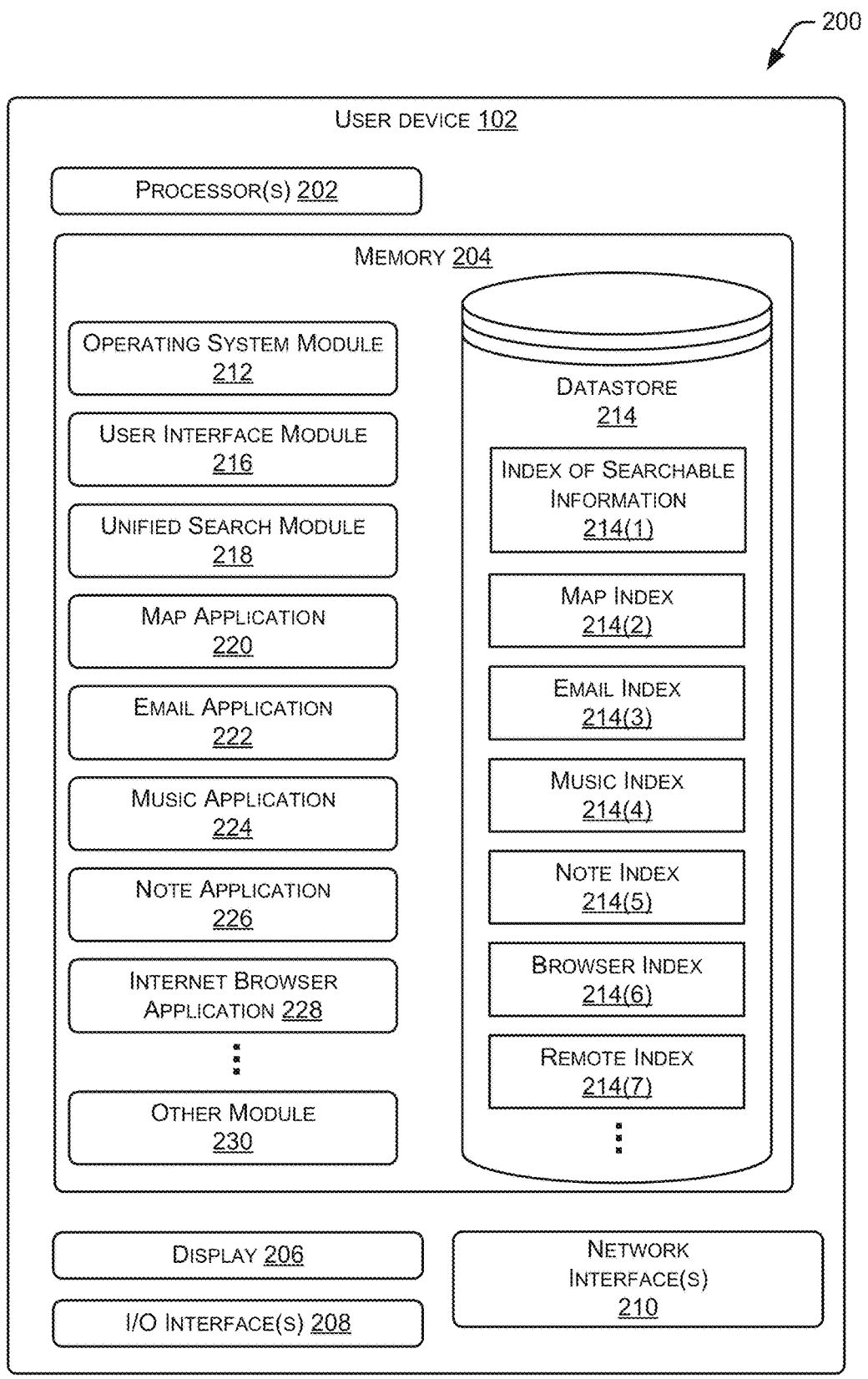
FIG. 2 illustrates a block diagram of the user device configured to provide unified search functionality via the unified search interface.

FIG. 2 illustrates a block diagram 200 of a user device 102 configured to provide unified search functionality via the unified search interface 106. The user device 102 may comprise one or more processors 202, one or more memories 204, one or more displays 206, one or more input/output ("I/O") interfaces 208, and one or more network interfaces 210. The user device 102 may include other devices not depicted.

The processor 202 may comprise one or more cores and is configured to access and execute at least in part instructions stored in the one or more memories 204. The one or more memories 204 comprise one or more computer-readable storage media ("CRSM"). The one or more memories 204 may include, but are not limited to, random access memory ("RAM"), flash RAM, magnetic media, optical media, and so forth. The one or more memories 204 may be volatile in that information is retained while providing power or non-volatile in that information is retained without providing power.

The display 206 is configured to present visual information to the user 104. The display 206 may comprise a reflective or emissive display configured to present images to the user 104. An emissive display emits light to form an image. Emissive displays include, but are not limited to, backlit liquid crystal displays, plasma displays, cathode ray tubes, light-emitting diodes, image projectors, and so forth. Reflective displays use incident light to form an image. This incident light may be provided by the sun, general illumination in the room, a reading light, and so forth. Reflective displays include, but are not limited to, electrophoretic displays, interferometric displays, cholesteric displays, and so forth. The display 206 may be configured to present images in monochrome, color, or both. In some implementations, the display 206 of the user device 102 may use emissive, reflective, or combination displays with emissive and reflective elements. In some implementations the display 206 may be external to the user device 102, such as when the user device 102 comprises a game console which is configured to operate by coupling to a television to provide visual output.

The one or more I/O interfaces 208 may also be provided in the user device 102. These I/O interfaces 208 allow for coupling devices such as keyboards, joysticks, touch sensors, cameras, microphones, speakers, haptic output devices, external memories, and so forth to the user device 102.

The one or more network interfaces 210 provide for the transfer of data between the user device 102 and another device directly such as in a peer-to-peer fashion, via the network 110, or both. The network interfaces 210 may include, but are not limited to, personal area networks ("PANs"), wired local area networks ("LANs"), wireless local area networks ("WLANs"), wireless wide area networks ("WWANs"), and so forth. The network interfaces 210 may utilize acoustic, radio frequency, optical, or other signals to exchange data between the user device 102 and another device such as an access point, a host computer, another user device 102, and the like.

The one or more memories 204 may store instructions or modules for execution by the processor 202 to perform certain actions or functions. The following modules are included by way of illustration, and not as a limitation. Furthermore, while the modules are depicted as stored in the memory 204, in some implementations, these modules may be stored at least in part in external memory, such as in the server 112 which is accessible to the user device 102 via the network 110. These modules may include an operating system module 212 configured to manage hardware resources such as the I/O interfaces 208 and provide various services to applications or modules executing on the processor 202. In some implementations, the operating system module 212 may be configured to present the unified search interface 106.

The one or more memories 204 may also store a datastore 214. The datastore 214 may comprise one or more databases, files, linked lists, or other data structures. The datastore 214 may be configured to store an index of searchable information 214(1) indicative of which data indices or other data structures are to be searched when a search is input at the unified search interface 106. These data indices may include a map index 214(2), email index 214(3), music index 214(4), note index 214(6), browser index 214(5), and so forth. These indices may be associated with particular applications or modules configured to execute on the user device 102. A remote index 214(7) may be provided which contains index information associated with remote resources, such as those stored at least in part on the server 112.

A user interface module 216 is configured to provide a user interface which handles inputs from and outputs to the user 104 during operation of the user device 102. This user interface includes the unified search interface 106 described above and may include the application user interface 108. For example, the user interface module 216 may be configured to present the unified search interface 106 as well as the application user interface 108 associated with an application in the foreground, the operating system, and so forth. User input may include key presses, touches on a touch screen, movement of the user device 102 or a portion thereof, speech input, gestures, images acquired by a camera, and so forth. User outputs may include presentation on the display 206, sound from a speaker, haptic output generating a physical sensation or the appearance of a physical sensation, and so forth.

A unified search module 218 is configured to accept user input received by the unified search interface 106 and generate search results. The unified search module 218 may be configured to work independently, or in conjunction with a module executing on the server 112 as accessed via the network 110. The unified search module 218 may be configured to search all information stored on the user device 102, or a subset of that information. For example, the unified search module 218 may be configured to search the contents of the datatore 214. In some implementations, particular applications may be registered for search by the unified search module 218. This registration may include adding the application, associated data files, associated indices, and so forth to a list of searchable information. For example, in some implementations the registration may include file names and paths for searchable information.

In some implementations, applications, associated indices, data files and so forth may be registered or added to a list of the searchable information, designating that the unified search module 218 may access this searchable information for searches. As a result, the unified search module 218 may be configured to omit from a search the searchable information such as indices or other information which are not designated. In some implementations, registration may take place at a time of installation of the module or application on the user device 102. In other implementations, the registration may be performed post-installation such as when a user specifies what information on the user device 102 is to be searched or not. Selective registration is discussed below with regard to FIG. 6. The index of searchable information 214(1) in the datastore 214 may be configured to store registration data, such as what data associated with which applications will be searchable by the unified search module 218.

The memory 204 may also store various modules configured to provide applications. These modules may include a map application 220 configured to provide map or directional information to a user. For example, the user 104 may request directions to a particular street address. Map information, or map related information such as appointment locations, may be stored in the map index 214(2) of the datastore 214. The unified search module 218 may be configured to access this map index 214(2) to generate search results.

An email application 222 may be configured to send and receive email messages. Information, such as email message content, header information, and so forth, may be maintained in an email index 214(3). The unified search module 218 may be configured to access this email index 214(3).

A music application 224 may be configured for playback of audio files. The music index 214(4) may contain information about the audio files, such as track name, duration, artist, album, and so forth.

A note application 226 may be configured to allow the user 104 to enter notes or other documents. The note index 214(5) may contain information about note content, date created, date last edited, and so forth.

An internet browser application 228 is configured to provide access to content such as web pages and so forth. For example, the internet browser application 228 may be configured to render at least a portion of hyper-text markup language ("HTML") files on the display 206. The browser index 214(6) may be based on data acquired from Internet browsing history or data associated with operation of the internet browser application 228. For example, the browser index 214(6) may comprise a list of recently visited web pages.

The indices 214(2)-214(7) are depicted as being separate data structures within the datastore 214 for convenience and not by way of limitation. For example, in some implementations the indices may be integrated with other data for the associated application, or within the application itself.

Other modules 230 may be present in the memory 204 as well, such as virtual private networking modules, text-to-speech modules, speech recognition modules, and so forth.

Figure 3:
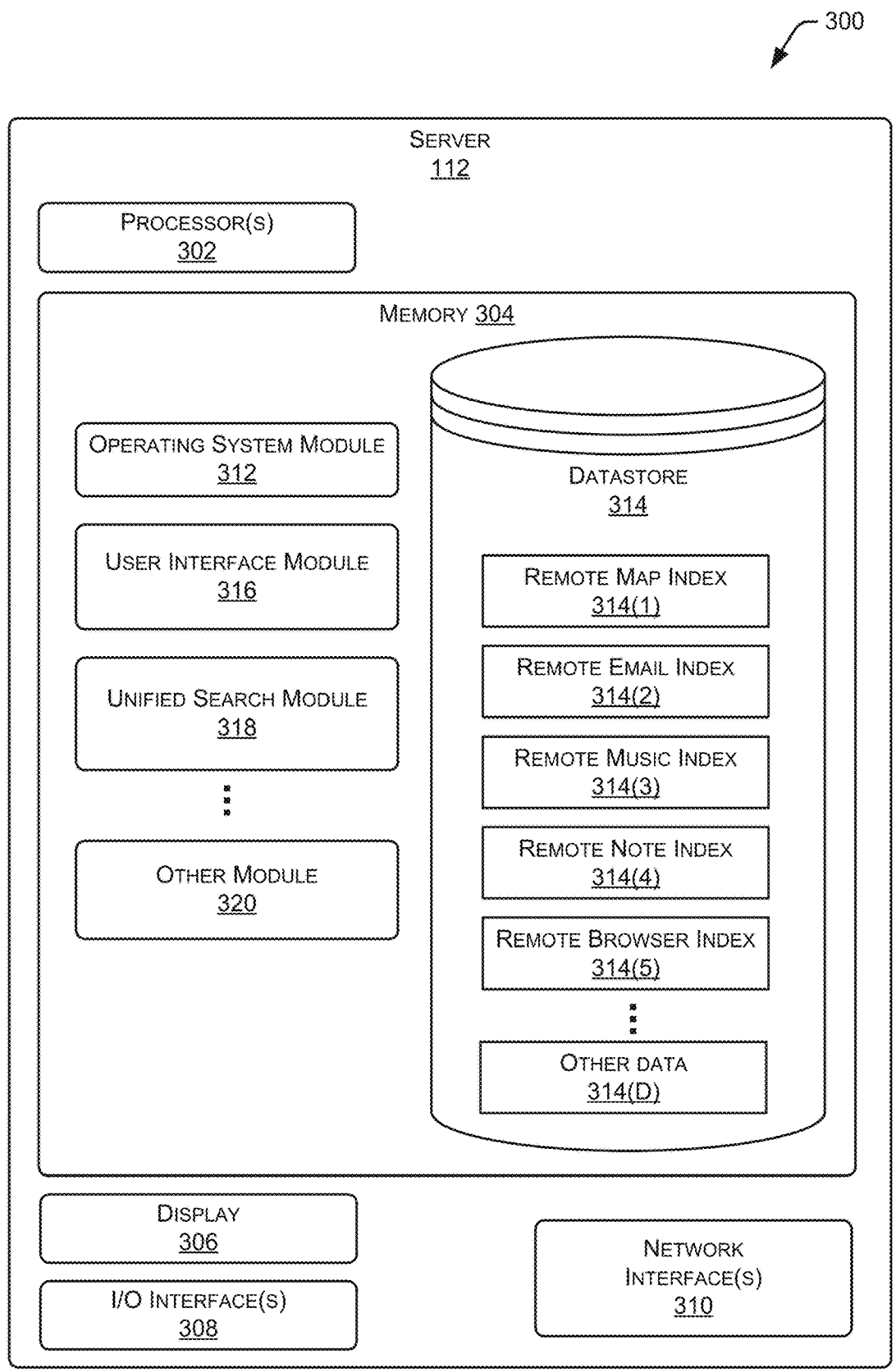
FIG. 3 illustrates a block diagram of a server configured to provide information to a search initiated by the unified search interface.

FIG. 3 illustrates a block diagram 300 of the server 112 configured to provide information to a search initiated by the unified search interface 106 and the unified search module 218. The server 112 may comprise one or more processors 302, one or more memories 304, one or more displays 306, one or more input/output ("I/O") interfaces 308, and one or more network interfaces 310. The memory 304 may store an operating system module 312 and a datastore 314. These components are similar to those described above with regard to FIG. 2. The modules and the functions below are shown on a single server for illustrative purposes and not by way of limitation. It is understood that the modules and the functions associated therewith may be provided by, or distributed across, one or more other servers.

The datastore 314 may store a remote map index 314(1), a remote email index 314(2), a remote music index 314(3), a remote note index 314(4), a remote browser index 314(5), and other data 314(D). These indices may be similar to those described above with regard to FIG. 2 and index data which is present in storage external to or remote to the user device 102, such as in the server 112. For example, the remote music index 314(3) may be configured to store audio file index data associated with audio files stored on the server 112 or another server 112 which are accessible by the user device 102 for streaming or download but not presently stored in the memory 204 of the user device 102. In another example, the remote browser index 314(5) may comprise information from Internet browsing which is facilitated with a split architecture where activity in various Internet browser subsystems is divided between the user device 102 and the server 112.

A user interface module 316 is stored in the memory 304. The user interface module 316 may be configured to provide a user interface, such as a web page, which is configured for display on the user device 102 or on another device.

The memory 304 may also store a unified search module 318. The unified search module 318 may be configured similarly to the unified search module 218 described above. In some implementations the unified search module 218 may work in conjunction with the unified search module 318. For example, the unified search module 218 on the user device 102 may pass along at least a portion of the user input received from the unified search interface 106 to the unified search module 318 on the server 112 to generate search results based on the indices in the datastore 314.

The unified search module 318 may be configured to access other search modules on the server 112 or on other servers 112. For example, the unified search module 318 may be configured to, when the search scope is set for maximum scope, search resources across web servers and other accessible storage on remote devices.

Other modules 320 may be present in the memory 304 as well. These modules may provide functions including authorization, authentication, accounting, security, and so forth.

Figure 4:
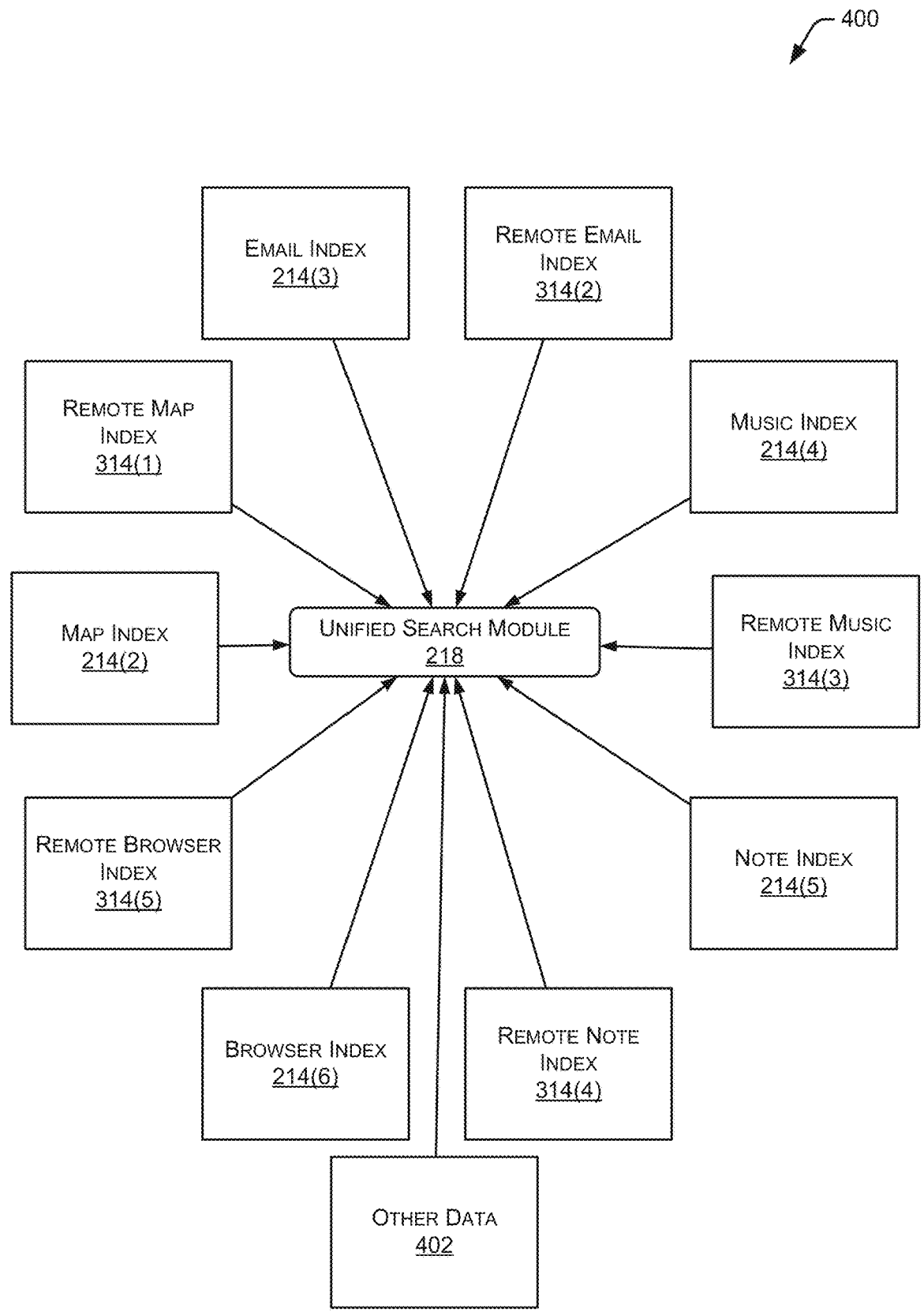
FIG. 4 illustrates a block diagram of data which may be used during the search initiated by the unified search interface.

FIG. 4 illustrates a block diagram 400 of the searchable information which may be used during the search initiated by the unified search interface 106 to generate search results. This illustration shows the unified search module 218 of the user device 102 for ease of illustration only, and not by way of limitation. As described above, in some implementations the search results may be provided, by the unified search module 218 of the user device 102, the unified search module 318 of the server 112, or a combination thereof.

The unified search module 218 or 318 may access searchable information comprising one or more of: the map index 214(2), the remote map index 314(1), the email index 214(3), the remote email index 314(2), the music index 214(4), the remote music index 314(3), the note index 214(5), the remote note index 314(4), the browser index 214(6), the remote browser index 314(5), and so forth. In some implementations, as discussed above, particular indices or other data may be specifically included or excluded from the search based at least in part on entries in the index of searchable information 214(1).

The searchable information may also include other data 402. This other data 402 may include non-index data, such as e-Books, HTML files, documents, operating system data, and so forth. For example, when the user 104 initiates a search with the unified search interface 106, the unified search module 218 may search the contents of e-Books present on the user device 102. The other data 402 may comprise text, audio files, video files, and so forth. Additional searchable information may be appended to the index of searchable information 214(1). For example, new information in the datastore 314 of the server 112 may be appended to the index of searchable information 214(1) such that the new information is now accessible via the unified search interface 106.

Illustrative User Interfaces

Figure 5:
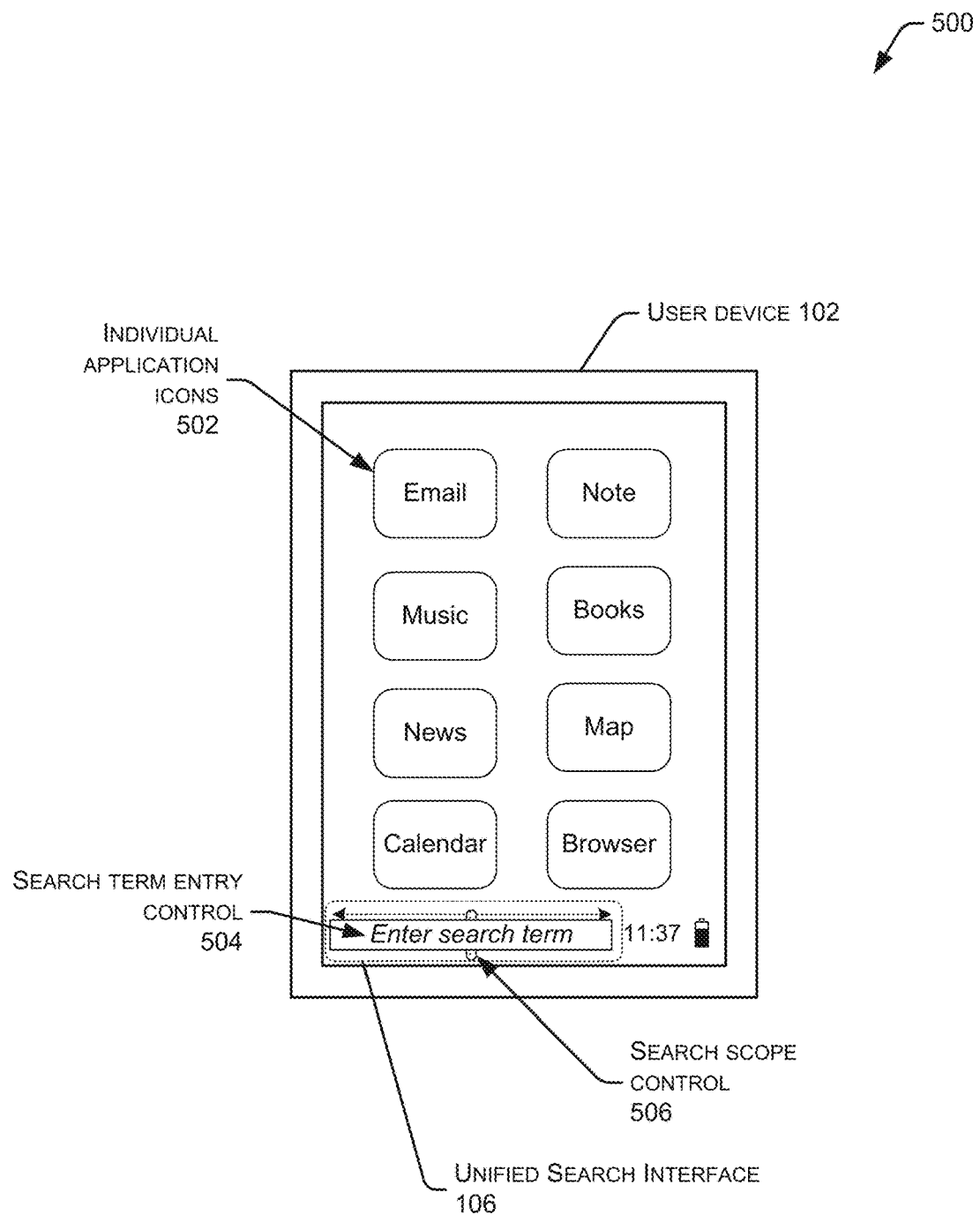
FIG. 5 is an illustrative user interface comprising the unified search interface.

FIG. 5 is an illustrative user interface 500 presented on the display 206 of the user device 102. In this and the following examples, the user device 102 is depicted as a tablet computer or a smartphone. However, the unified search interface 106 may be provided on other user devices 102 as described above.

The user interface 500 comprises a set of individual application icons 502 representing the different applications accessible on the user device 102. Activation of the individual application icons 502, such as by selecting with a cursor or touching where the user device 102 comprises a touch sensor, may bring the module associated with the application to the foreground. For example, touching the "email" icon may execute the email application 222.

A designated portion of the display 206 may be used for presentation of the unified search interface 106. For example, as shown here, the unified search interface 106 is presented at the bottom of the display. The unified search interface 106 may be configured to be visible or presented at all times during normal operation, excluding time for bootup and shutdown of the user device 102. For example, when the user interface uses a window metaphor, the unified search interface 106 may be configured such that one or more windows cannot occlude it. As a result, the unified search interface 106 remains visible during use of the user device 102.

The designated portion of the display 206 may be fixed or moveable on the display. For example, the user 104 may move the unified search interface 106 to another position on the display 206. However, as mentioned above, the unified search interface 106 is persistent in remaining presented.

In this illustration, the unified search interface 106 comprises one or more elements which may include a search term entry control 504 and a search scope control 506. The search term entry control 504 provides a user interface element with which the user 104 may enter a search term, select a search term, and so forth. The search term may be text, human speech, an image, sound, and so forth. For example, the search term entry control 504 may be configured to accept text typed on a keyboard, or a picture captured from a camera of the user device 102.

In some implementations the unified search interface 106 may be configured to present in the search term entry control 504 previously entered items such as words, phrases, icons, names of files or applications previously accessed, and so forth. The user 104 may then select one of these items, build a new search based on these items, or enter a different item.

The unified search module 218 may be configured to initiate a unified search upon a user command, such as pressing an "enter" or "done" button. In another implementation, the unified search module 218 may initiate a series of searches based on ongoing input by the user. For example, the user 104 may select one icon from a list, followed by another, followed by another, which proceed to generate and subsequently narrow the search.

The unified search interface 106 may include a search scope control 506 configured to accept user input with regard to a desired search scope. As described above, the search scope determines one or more of what, where, or how information is searched. For example, a narrow search scope may be limited to data available on the user device 102. In comparison, a medium search scope may comprise the data available on the user device 102 as well as information stored remotely which is associated with the user device 102 or the user 104. Likewise, a broad search scope may include all of that in the medium search scope plus results from an Internet search engine.

The search scope control 506 may be configured to modify the search by the unified search module 218 or presentation of search results previously generated by the unified search module 218. For example, the unified search module 218 may be configured to generate search results using the broadest available scope, but may present the search results constrained by a setting of the search scope control 506.

The search scope control 506 may be dynamically variable before, during, or after entry of data within the search term entry control 504. For example, the user 104 may move a sliding search scope control 506 to set a particular search scope, and then enter the search term into the search term entry control 504. In comparison, the user 104 may enter the search term, and then use the search scope control 506 to vary the scope of the search or the presentation of search results.

The unified search interface 106 may be presented when the user 104 is not yet logged in or identified by the user device 102. For example, the user device 102 may be locked and require user input to unlock the user device 102 for general use. While the user device 102 is locked, the unified search interface 106 may be presented and accessible for use. In some implementations, when the user 104 initiates a search using the unified search interface 106 but is not yet logged in or identified, the unified search module 218 may be configured to return a subset of results which would otherwise be obtained by executing the search while logged in. For example, when the user device 102 is locked, the search may restricted to the music index 214(4) local to the user device 102 but not the remote music index 314(3) or the email index 214(3). When unlocked, the same search may return results from all of the indices which are indicated in the index of searchable information 214(1).

Figure 6:
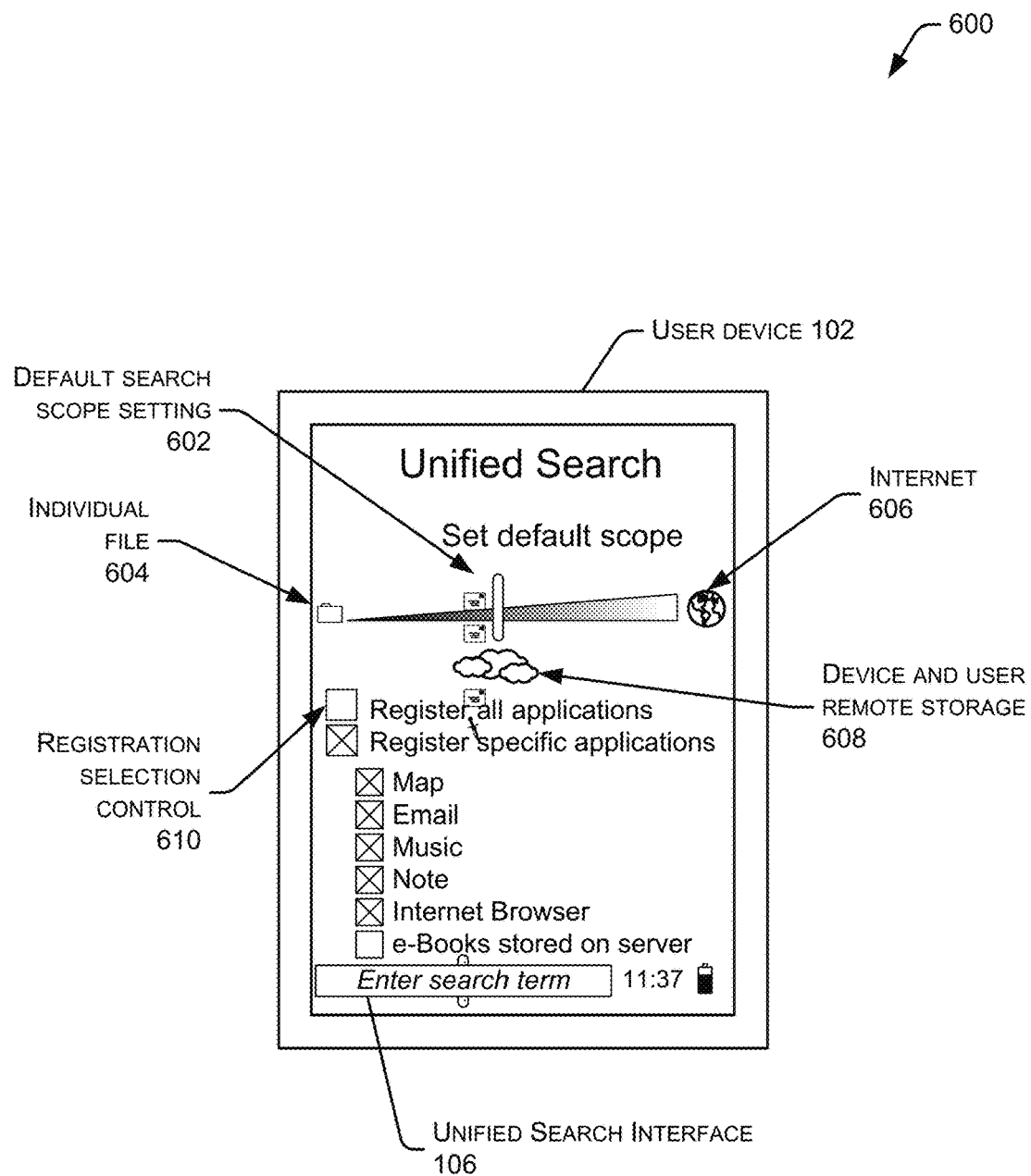
FIG. 6 illustrates a user interface to configure unified search functionality on the user device.

FIG. 6 illustrates a user interface 600 to configure unified search functionality on the user device 102. Different users 104 may have different preferences or parameters for the execution of a unified search. The user interface 600 illustrates some of the configuration settings which may be made by the user 104 or an administrator to change operation of the unified search module 218 on the user device 102 or the server 112.

A default search scope setting 602 is illustrated. This setting indicates the current default scope which will be used when the user 104 initiates a unified search with the unified search interface 106 and processed by the unified search module 218. This is a default setting, and may be overridden by the user 104 as described above by adjusting the search scope control 506.

The search scope may be progressive, ranging from one end of a continuum to another. As shown here, the search scope may range from an individual file 604 to the internet 606. At the midpoint of the search scope continuum indicated here, the search scope may include the user device 102 and the device and user remote storage 608.

Scope may be viewed as increasing from the individual file 604 level having a narrow scope towards the broadest scope of the Internet 606. However, in some implementations, different search scope settings may incorporate different sets of data. For example, the narrow search scope may be configured to include local notes on the user device 102 while the broad search scope may be configured to omit local notes on the user device 102.

The user interface 600 may also present one or more registration selection controls 610. As described above, the user 104 or an administrator may select particular indices or other data for inclusion or exclusion in the unified search. Registration of indices or other data may be manual, such as with the user interface 600, or automatic.

In this illustration, the registration selection controls 610 are depicted as checkboxes, allowing the user to select or deselect particular applications and associated data for inclusion in the unified search. As shown here, the user 104 has chosen to register specific applications, and has deselected the e-Books stored on the server 112. As a result, the search results generated by the unified search module 218 will not include data from the e-Books stored on the server 112. However, when the scope is broad, such as set to Internet 606, search engine results may be returned.

FIGS. 7-10 illustrate the persistence of the unified search interface 106 while different applications are presented. Also illustrated are the effects of the user modifying the search scope by using the search scope control 506 as described above.

Figure 7:
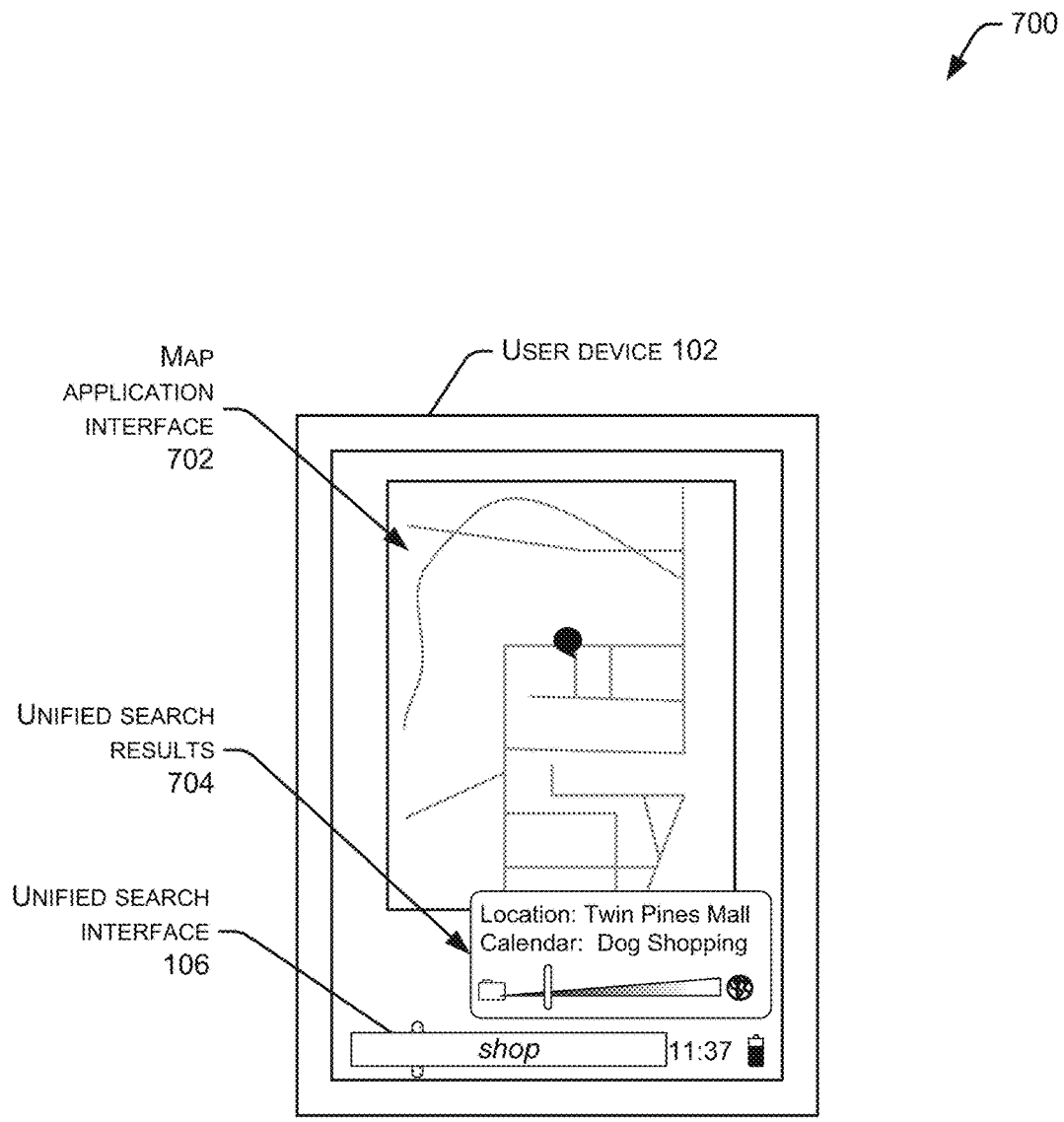
FIGS. 7-10 illustrate a persistent unified search interface when different applications are presented as well as a control to vary search scope.

FIG. 7 illustrates a user interface 700 in which a map application interface 702 is presented on the display 206 of the user device 102. In this illustration, the user has entered the search term "shop" in the unified search interface 106. Unified search results 704 as provided by the unified search module 218 are depicted as a pop-up or overlay window. The unified search results 704 are prioritized in this illustration to show results relating to a current application focus. For example, the current application focus is on the map application interface 702 which is presented on the display 206. The application focus indicates which application is currently configured to accept input from the user, such as from a touch sensor, keyboard, mouse, and so forth. As a result, the search results which relate to the map application 220, the map index 214(2), and the remote map index 314(1) are presented first. In some implementations, the first result on the unified search results 704 may be presented automatically.

In this illustration, the search scope control 506 has been set to relatively narrow, which may correspond to returning data associated with local applications except for the note application 226 and not those accessible via the network 110. As a result, the unified search results 704 include the location of "Twin Pines Mall" and a calendar item for "Dog Shopping on Tuesday" as illustrated here. In some implementations, the user 104 may adjust the search scope control 506 to change the results presented in the unified search results 704.

Figure 8:
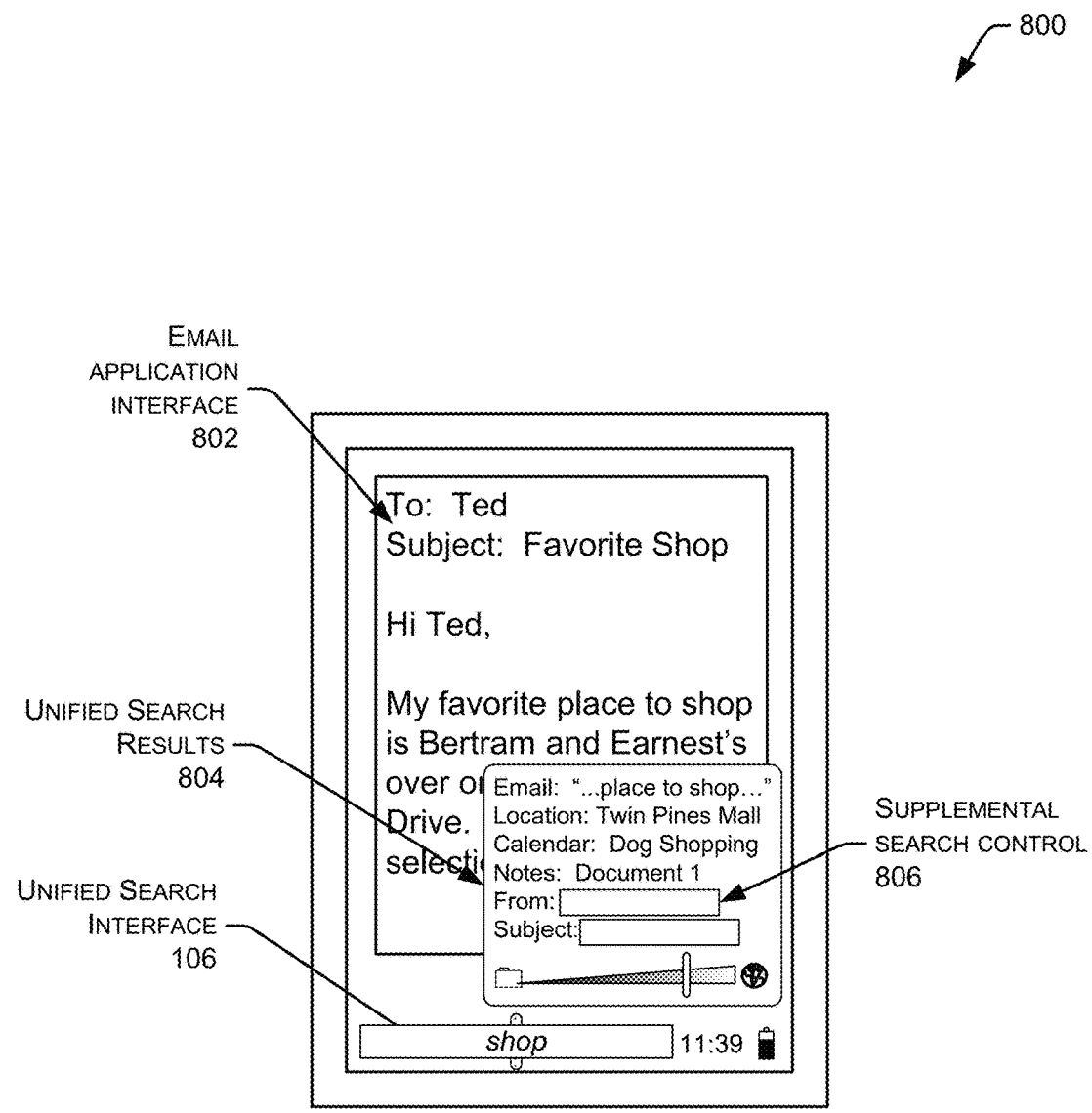

FIG. 8 illustrates a user interface 800 in which an email application interface 802 is presented on the display 206 of the user device 102. In this illustration, the user has again entered the search term "shop" in the unified search interface 106. Unified search results 804 as provided by the unified search module 218 are depicted, again as a pop-up or overlay window. As above, the unified search results 804 are prioritized in this illustration to show results relating to a current application focus. Given that the email application 222 is now in use, the current application focus is on the email application 222 and corresponding email application interface 802 which is presented on the display 206. As a result, the search results which relate to the email application 222, the email index 214(3), and the remote email index 314(2) are presented first. In comparison, results associated with the map application 220 which was previously in focus are shown second.

In some implementations, supplemental search controls 806 may be provided. The supplemental search controls 806 provided may be determined based at least in part on the application focus. For example, as shown here, while in the email application 222, the supplemental search controls 806 may comprise specific search fields such as "from" and "subject". In comparison, when the application focus is on the map application 220, the supplemental search control 806 may comprise search fields such as a "street name" or "maximum driving time." The supplemental search controls 806 may be specified by the application developer, the users 104, or both.

In comparison to FIG. 7, in this illustration, the search scope control 506 has been set to relatively broad, which may correspond to returning data associated with local applications as well as some data accessible via the network 110. As a result, the unified search results 804 include a particular email, the location of "Twin Pines Mall, a calendar item for "Dog Shopping on Tuesday," and a note entitled "Document1" which contains the text "shop."

Figure 9:
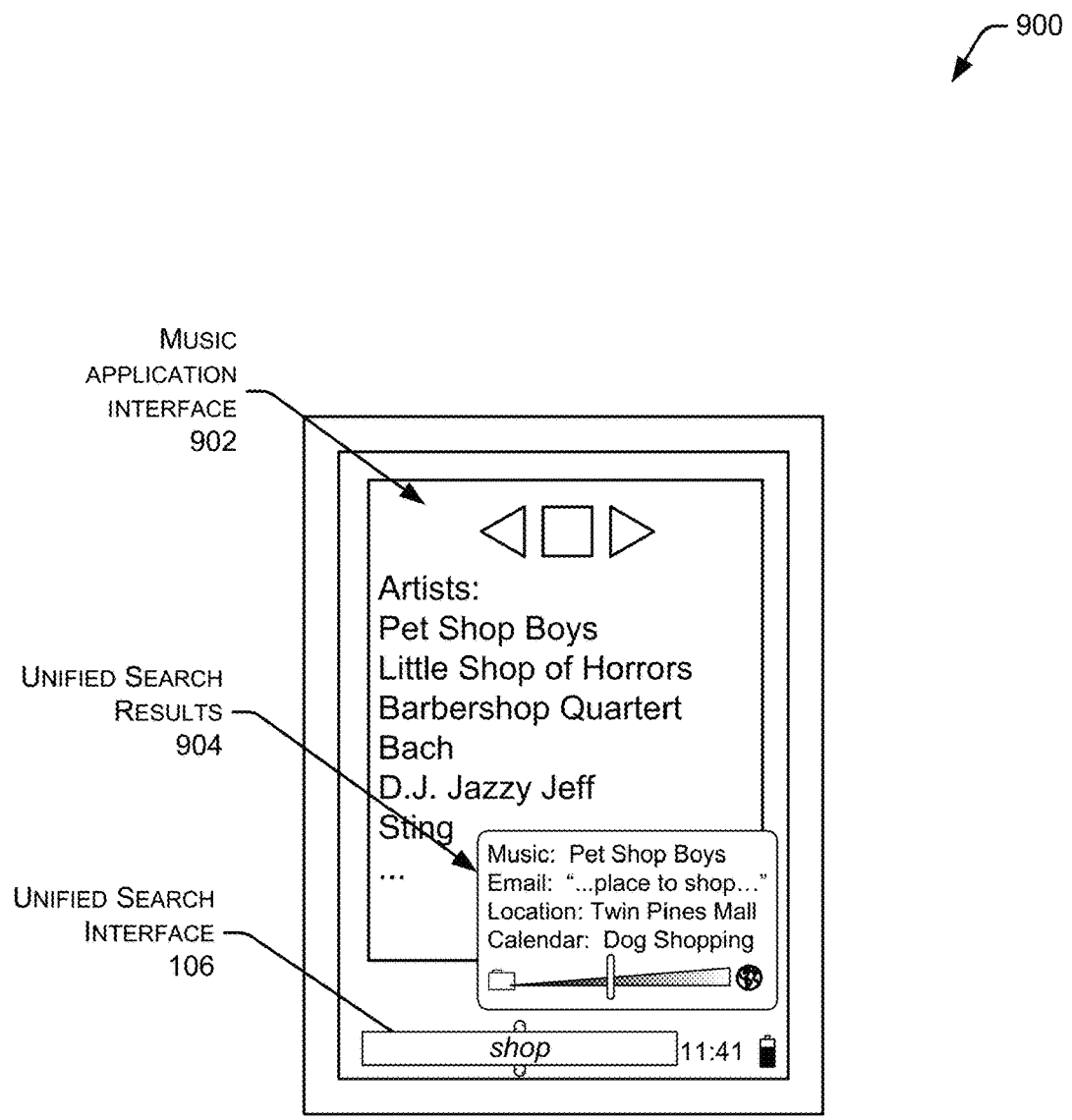

FIG. 9 illustrates a user interface 900 in which a music application interface 902 is presented on the display 206 of the user device 102. In this illustration, the user has again entered the search term "shop" in the unified search interface 106. Unified search results 904 as provided by the unified search module 218 are depicted, again as a pop-up or overlay window. As above, the unified search results 904 are prioritized in this illustration to show results relating to a current application focus. Given that the music application 224 is now in use, the current application focus is on the music application 224 and the corresponding music application interface 902 which is presented on the display 206. As a result, the search results which relate to the music application 224, the music index 214(4), and the remote music index 314(3) are presented first. In comparison, results associated with the email application 222 which was previously in focus are shown second.

In comparison to FIGS. 7 and 8, in this illustration, the search scope control 506 has been set in about the middle of the continuum, which may correspond to returning data associated with some local applications as well as some user data accessible via the network 110. As a result, the unified search results 904 include music from the "Pet Shop Boys," a particular email, the location of "Twin Pines Mall, and a calendar item for "Dog Shopping on Tuesday."

Figure 10:
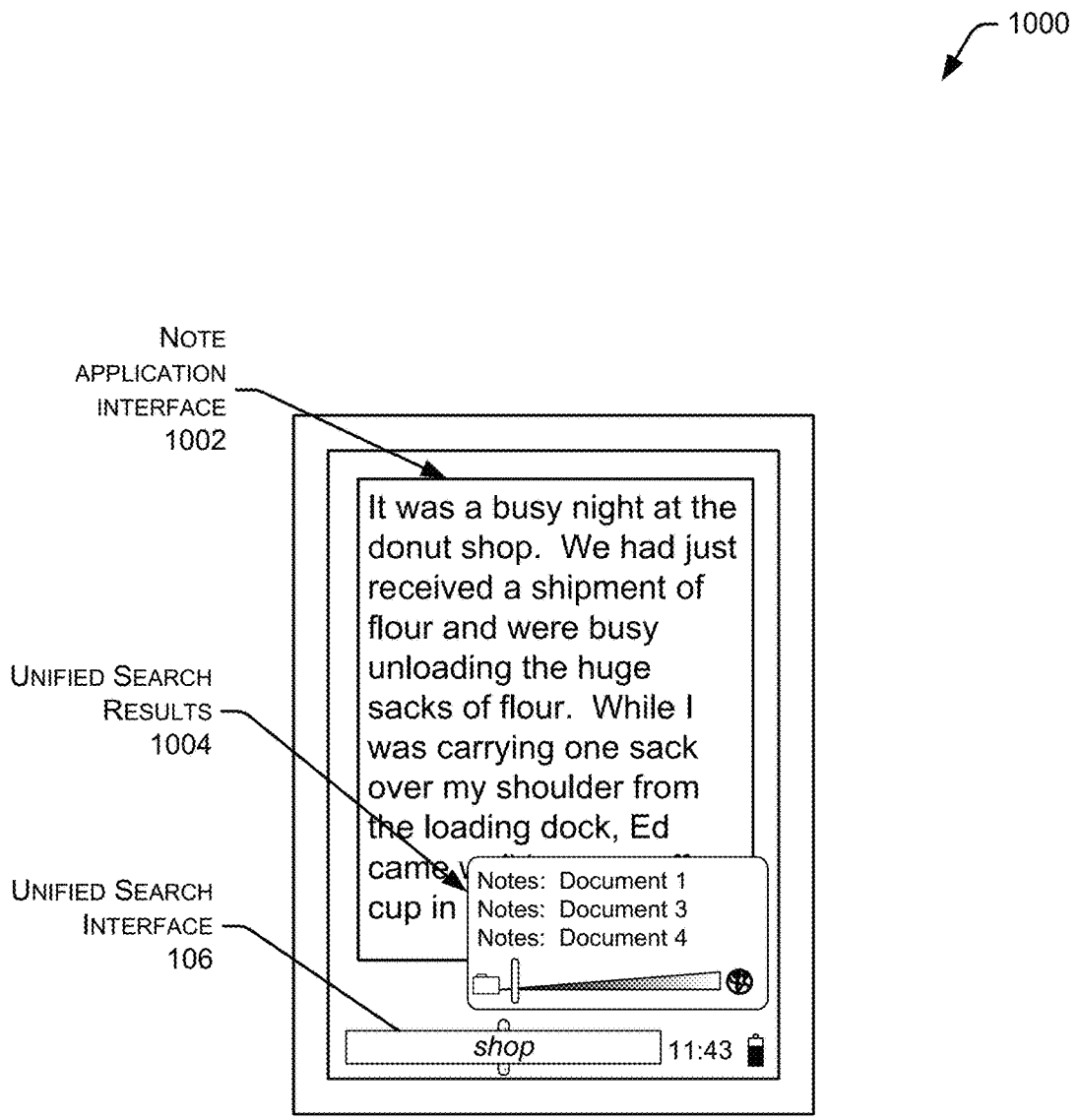

FIG. 10 illustrates a user interface 1000 in which a note application interface 1002 is presented on the display 206 of the user device 102. In this illustration, the user has again entered the search term "shop" in the unified search interface 106. Unified search results 1004 as provided by the unified search module 218 are depicted, again as a pop-up or overlay window. As above, the unified search results 1004 are prioritized in this illustration to show results relating to a current application focus. Given that the note application 226 is now in use, the current application focus is on the note application 226 and the corresponding note application interface 1002 which is presented on the display 206. As a result, the search results which relate to the note application 226 will be presented first.

In comparison to FIGS. 7-9, in this illustration, the search scope control 506 has been set to the narrowest end of the continuum, which may correspond to returning data associated with the application currently in focus. As a result, the unified search results 1004 are restricted only to the note application 226.

Illustrative Processes

Figure 11:
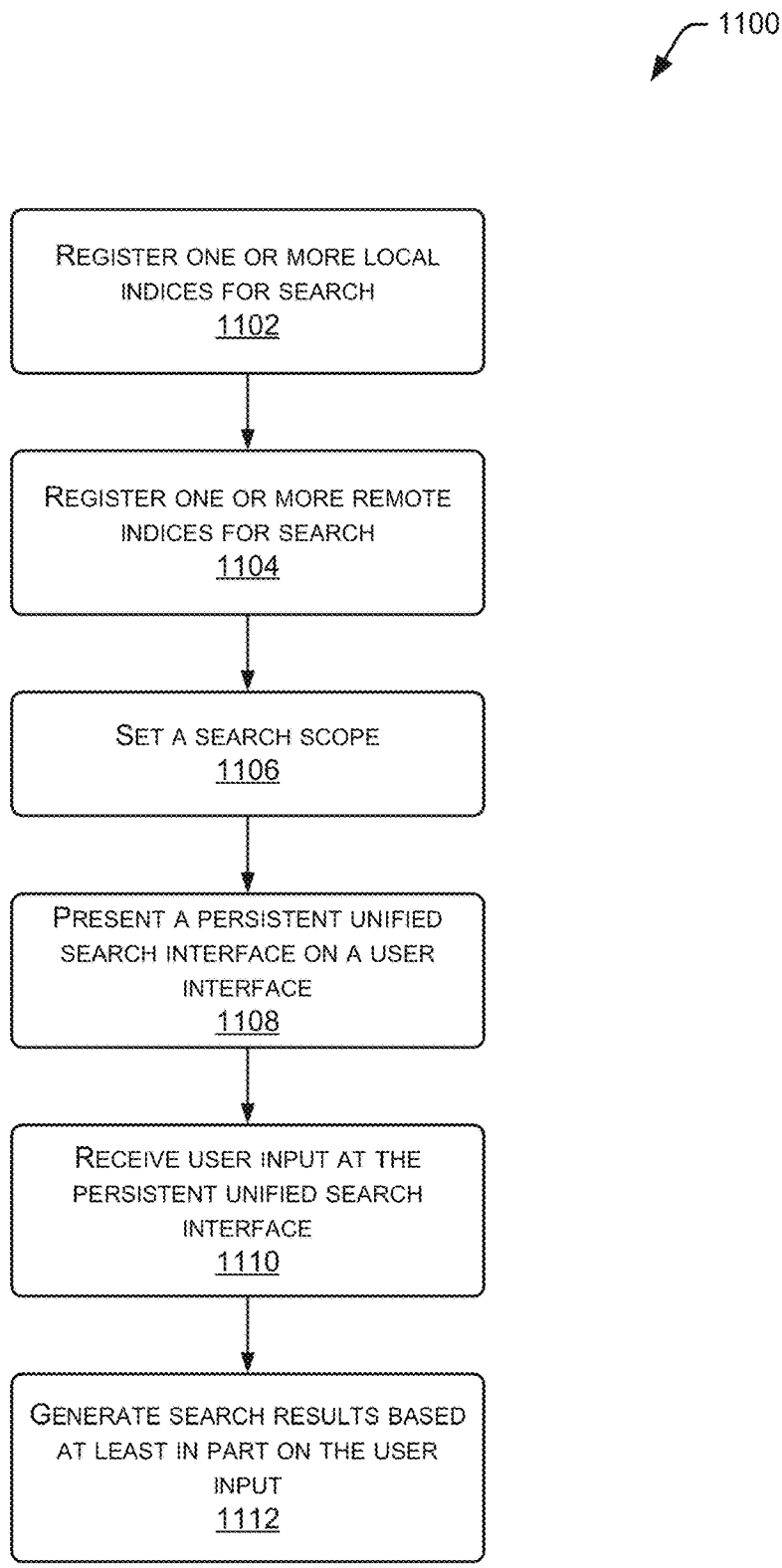
FIG. 11 illustrates a flow diagram of a process of providing search results based at least in part on user input via the unified search interface.

FIG. 11 illustrates a flow diagram of a process 1100 of providing search results based at least in part on user input via the unified search interface 106. This process may be implemented by the unified search module 218, 318, or both.

Block 1102 maintains a list of searchable information. This list may comprise a register of one or more local indices associated with one or more applications. For example, the map index 214(2), the email index 214(3), the music index 214(4), and so forth may be registered in the index of searchable information 214(1).

Block 1104 registers one or more remote indices accessible via the network interface which are associated with the one or more applications. For example, a remote map index 314(1), a remote email index 314(2), a remote music index 314(3), a remote note index 314(4), a remote browser index 314(5), and other data 314(D) may be registered in the index of searchable information 214(1).

Block 1106 sets a search scope. This may be a default value, such as set with the default search scope setting 602, or adjusted by the search scope control 506.

Block 1108 presents on the display 206 the persistent unified search interface 106. As described above, the persistent unified search interface 106 is configured to remain on the display 206. As a result, the unified search interface 106 is presented in addition to or concurrently with an application user interface 108 or other user interface. The unified search interface 106 may include a search scope control 506 configured to modify the search scope.

Block 1110 receives user input at the persistent unified search interface 106. For example, the user 104 may enter via a keyboard or touchscreen the word "shop." The input may include the user setting the search scope control 506.

Block 1112 generates search results based at least in part on the user input and the searchable information. As described above, the searchable information may include the one or more local indices, the one or more remote indices, documents, and so forth. As described above, in some implementations the search may be constrained by the search scope, or the search results may be constrained by the search scope.

Figure 12:
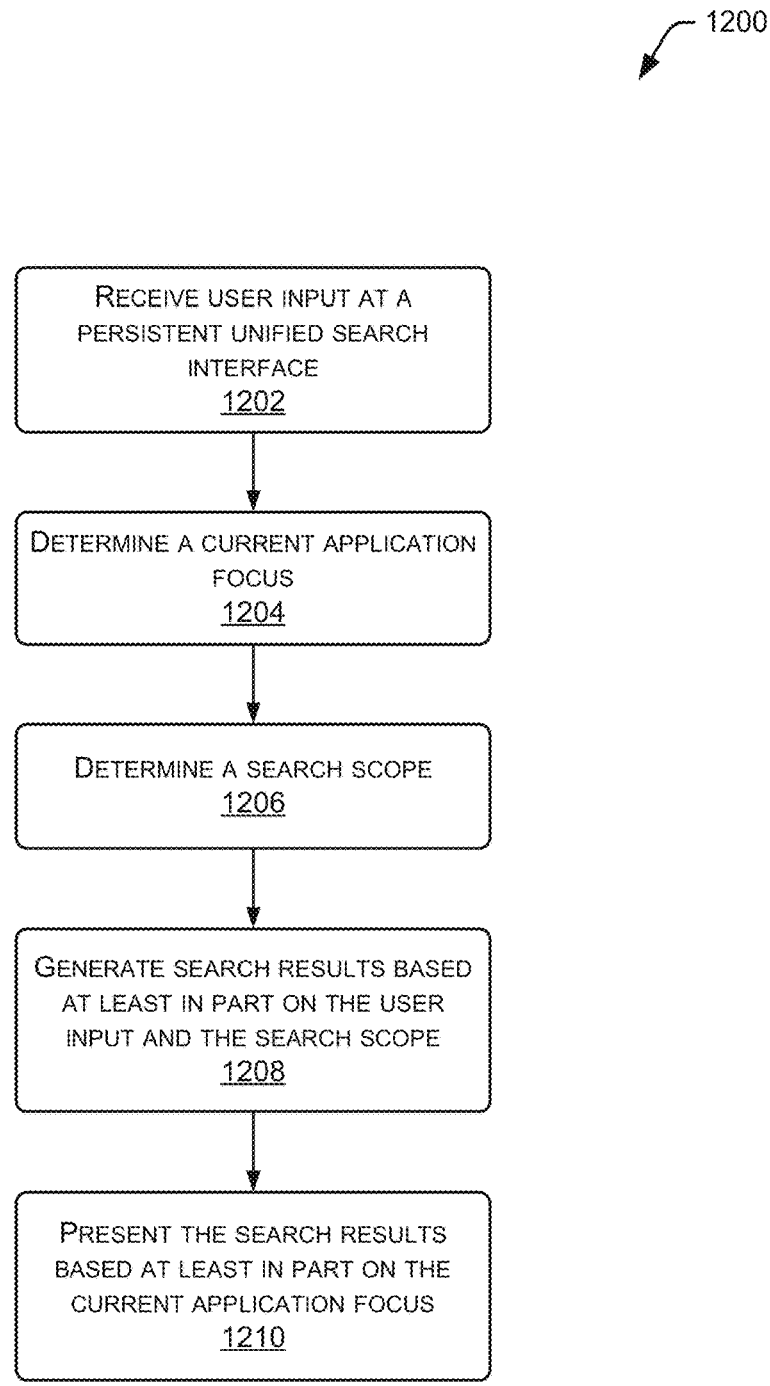
FIG. 12 illustrates a flow diagram of a process of providing search results from a unified search interface based at least in part on a current application focus.

FIG. 12 illustrates a flow diagram of a process 1200 of providing search results from a unified search interface based at least in part on a current application focus. This process may be implemented by the unified search module 218, 318, or both.

Block 1202 receives user input at the persistent unified search interface 106. For example, the user input may comprise text, such as the user may enter the word "shop" in to the search term entry control 504. As described above, the unified search interface 106 is configured to persist. For example, the unified search interface 106 may be part of a desktop user interface.

Block 1204 determines a current application focus. As described above, the application focus indicates an application in the foreground which is configured to interact with a user 104.

Block 1206 determines a search scope. As described above, the search scope may be retrieved from a default setting or be based at least in part on a user input from the search scope control 506 of the unified search interface 106.

Block 1208 generates search results based at least in part on the user input. In some implementations the search results may also be generated based at least in part on the search scope.

Block 1210 presents the search results based at least in part on the current application focus. In some implementations, the search results may be presented by sorting such that the search results associated with the current application focus are presented at a beginning of the search results. For example, the search results associated with the current application in focus may be presented first.

Figure 13:
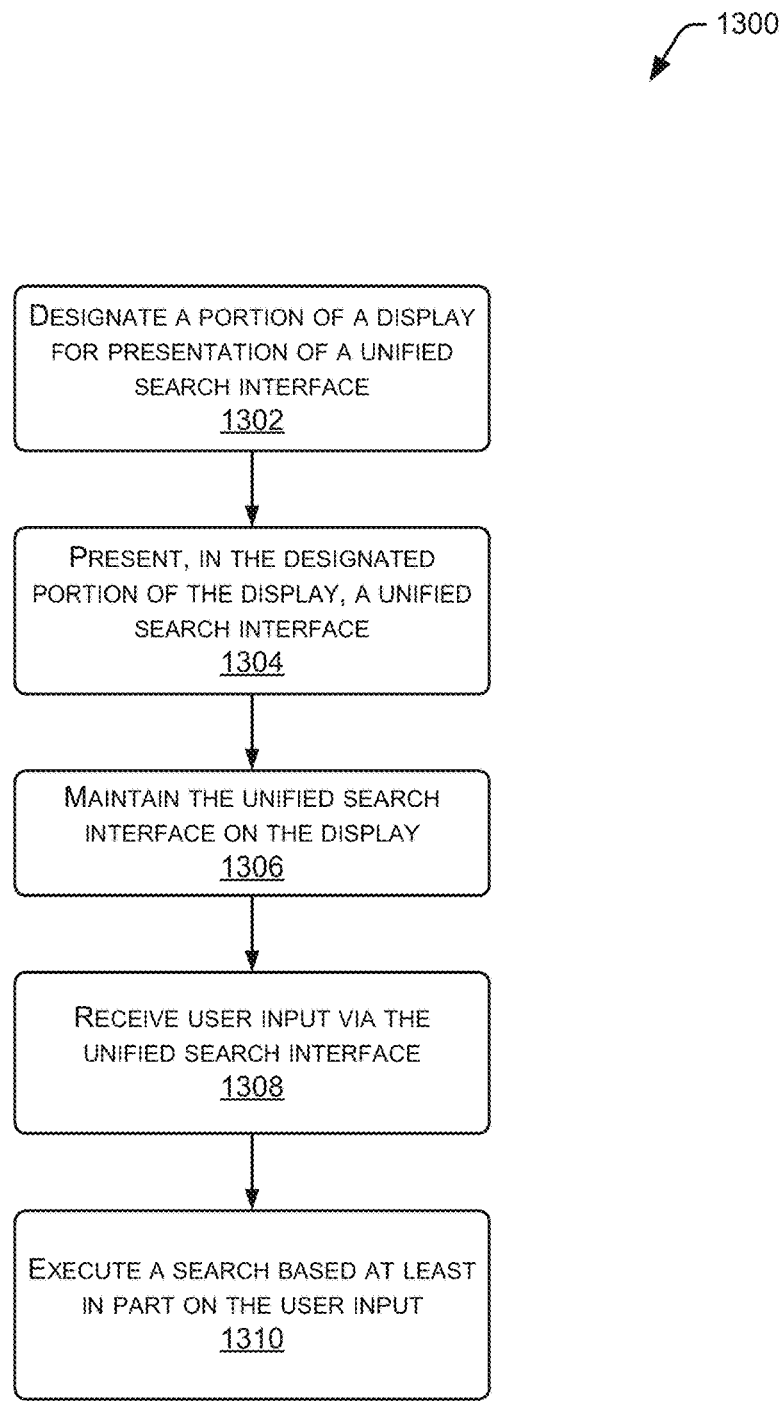
FIG. 13 illustrates a flow diagram of a process of generating the unified search interface.

FIG. 13 illustrates a flow diagram of a process 1300 of generating the unified search interface 106. This process may be implemented at least in part by one or more of the operating system module 212, the user interface module 216, or the unified search module 218.

Block 1302 designates a portion of the display 206 for presentation of a unified search interface 106. For example, the bottom half-inch of the display 206 may be designated as the region to present the unified search interface 106. In some implementations, the designated portion of the display for presentation of the unified search interface 106 remains fixed.

Block 1304 presents, in the designated portion of the display, the unified search interface 106. Block 1306 maintains the unified search interface 106 on the display. For example, as the display 206 is redrawing to adjust for changes as applications move from the foreground to the background. The unified search interface 106 may comprise a search scope control 506 configured to allow adjustment of the search scope.

Block 1308 receives user input via the unified search interface 106. In some implementations the user input may comprise one or more gestures detected by a touch sensor, text entered on a keyboard, and so forth. For example, the user may enter the search term "shop" in the search term entry control 504.

Block 1310 executes a search based at least in part on the user input. For example, the unified search module 218 may be configured to execute the search for the "shop" search term. In some implementations, the search may be based at least in part on the search scope.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:

registering, by a device, a search index of a first application, wherein registering comprises adding the first application to searchable information comprising a second application, and wherein the first application is an e-mail application;

receiving a first user input at a first search interface;

receiving first search results based at least in part on a first search, the first search using the first user input and applications whose respective search index has been registered to the searchable information;

determining, by at least one processor, a first subset of the first search results, the first subset openable by the first application;

causing a display to present a first presentation of the first subset and first data associated with the first subset, and a second presentation of an indication of the first application, wherein the first data present a first sender of a first e-mail of the first subset and a second sender of a second e-mail of the first subset;

receiving a user selection of the indication of the first application, the user selection indicative of a request to perform a second search using the first application and the first user input;

based at least in part on the user selection and the second search using the first application and the first user input, causing the display to present the first application and second search results, the second search results comprising at least a portion of the first subset, the at least a portion presenting the first sender of the first e-mail, a first subject of the first e-mail, a second sender of a second e-mail, and a second subject of the second e-mail;
receiving a second user input at a second search interface of the first application;
receiving third search results based at least in part on a third search using the second user input, wherein the third search results comprise a second subset of the first subset; and
causing the display to present the third search results.

2. The method of claim 1, wherein the first search interface comprises a search scope control, and wherein the search scope control comprises a slider control element that varies a search scope when manipulated.

3. The method of claim 1, wherein the first search interface comprises one or more of a haptic user interface, a character user interface, an audio interface, or a graphic user interface.

4. The method of claim 1, wherein the first search results are based at least in part on searchable information comprising:
the search index of the first application; and
a remote index accessible via a network connection and associated with the first application.

5. The method of claim 1, wherein the searchable information further comprises first data associated with the first application and second data associated with the second application.

6. The method of claim 1, wherein determining the first subset of the first search results comprises determining the first subset of the first search results from the search index of the first application.

7. The method of claim 1, further comprising:
receiving a user request not to register a second search index of a third application, wherein the user request is associated with an installation of the third application on the device,
wherein the first search excludes the third application based at least in part on the user request.

8. The method of claim 1, wherein registering the search index is associated with an installation of the first application on the device.

9. A system comprising:
at least one memory that stores computer-executable instructions; and
at least one processor configured to access the at least one memory, wherein the at least one processor is configured to execute the computer-executable instructions to:
register a search index of a first application, wherein registering comprises adding the first application to searchable information comprising a second application, wherein the first application is an e-mail application;
designate a portion of a display for presentation of a first search interface;
receive a first user input via the first search interface;
execute a first search based at least in part on the first user input and applications whose respective search index has been registered to the searchable information to generate first search results;
determine a first subset of the first search results, the first subset openable by the first application;
cause the display to present a first presentation of the first subset and first data associated with the first subset, and a second presentation of an indication of the first application, wherein the first data present a first sender of a first e-mail of the first subset and a second sender of a second e-mail of the first subset;
receive a user selection of the indication of the first application, the user selection indicative of a request to perform a second search using the first application and the first user input;
based at least in part on the user selection and the second search using the first application and the first user input, cause the display to present the first application and second search results, the second search results comprising at least a portion of the first subset, the at least a portion presenting the first sender of the first e-mail, a first subject of the first e-mail, a second sender of a second e-mail, and a second subject of the second e-mail;
receive a second user input at a second search interface of the first application;
receive third search results based at least in part on a third search using the second user input, wherein the third search results comprise a second subset of the first subset; and
cause the display to present the third search results.

10. The system of claim 9, wherein the searchable information further comprises data associated with the first application and stored in one or more computer-readable media accessible via a network interface and a second search index.

11. The system of claim 9, wherein the searchable information further comprises one or more of metadata, application data, documents, audio files, video files, or hypertext markup language files.

12. The system of claim 9, wherein the first user input comprises one or more gestures detected by a touch sensor.

13. The system of claim 9, the first search interface comprising a search term entry element, wherein the first user input is received using the search term entry element.

14. The system of claim 9, wherein the first search interface is presented at a designated portion of the display, and wherein the designated portion of the display remains fixed during execution by the at least one processor.

15. The system of claim 9, wherein to determine the first subset comprises to determine the first subset from the search index of the first application.

16. A device, comprising:
at least one memory storing computer-executable instructions; and
at least one processor coupled to a display and the at least one memory and configured to execute the computer-executable instructions to:
register a search index of a first application, wherein registering comprises adding the first application to searchable information comprising a second application, and wherein the first application is an e-mail application;
designate a portion of the display for presentation of a first search interface;
receive a first user input via the first search interface;
execute a first search based at least in part on the first user input and applications whose respective search index has been registered to the searchable information to generate first search results;
determine a first subset of the first search results, the first subset openable by the first application;
cause the display to present a first presentation of the first subset and first data associated with the first subset, and a second presentation of an indication of the first application, wherein the first data present a first sender of a first e-mail of the first subset and a second sender of a second e-mail of the first subset;

receive a user selection of the indication of the e-mail application, the user selection indicative of a request to perform a second search using the e-mail application and the first user input;

based at least in part on the user selection and the second search using the e-mail application and the first user input, causing the display to present the e-mail application and second search results, the second search results comprising at least a portion of the first subset, the at least a portion presenting the first sender of the first e-mail, a first subject of the first e-mail, a second sender of a second e-mail, and a second subject of the second e-mail;

receive a second user input at a second search interface of the e-mail application;

receive third search results based at least in part on a third search using the second user input, wherein the third search results comprise a second subset of the first subset; and cause the display to present the third search results.

17. The device of claim 16, wherein the searchable information further comprises data associated with the first application and stored in one or more computer-readable media accessible via a network interface and a third search index.

18. The device of claim 16, wherein the searchable information further comprises one or more of metadata, application data, documents, audio files, video files, or hypertext markup language files.

19. The device of claim 16, wherein the first user input comprises one or more gestures detected by a touch sensor.

\* \* \* \* \*